Dec. 1, 1936. R. L. FULTON 2,062,874
VEHICLE WHEEL SUSPENSION
Filed Oct. 22, 1934 2 Sheets-Sheet 1

INVENTOR.
R. L. FULTON
BY
M. Talbert Dick
ATTORNEY.

Dec. 1, 1936.   R. L. FULTON   2,062,874
VEHICLE WHEEL SUSPENSION
Filed Oct. 22, 1934   2 Sheets-Sheet 2
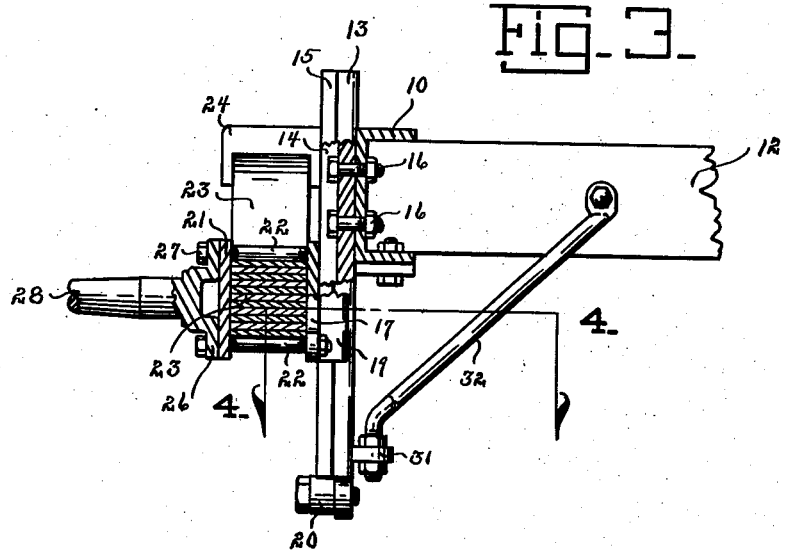
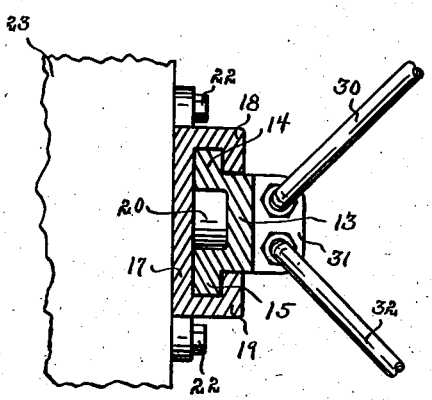
INVENTOR.
R.L.FULTON
BY
M.Talbert Dick
ATTORNEY.

Patented Dec. 1, 1936

2,062,874

UNITED STATES PATENT OFFICE 2,062,874

VEHICLE WHEEL SUSPENSION

Robert L. Fulton, Webster City, Iowa

Application October 22, 1934, Serial No. 749,420

3 Claims. (Cl. 267—19)

The principal object of my invention is to provide a means for yieldingly independently supporting a load object on a wheel or like.

A further object of this invention is to provide a yieldable individual wheel attaching device that is simple in construction and that is easily attached to vehicle trailers and similar load objects.

A still further object of my invention is to provide a method of and means for yieldingly supporting a load object to a wheel, glide, or like that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 3 is an enlarged end-sectional view of my wheel attaching device.

Fig. 4 is an enlarged top plan-sectional view of the device taken on line 4—4 of Fig. 3.

Figure 1:
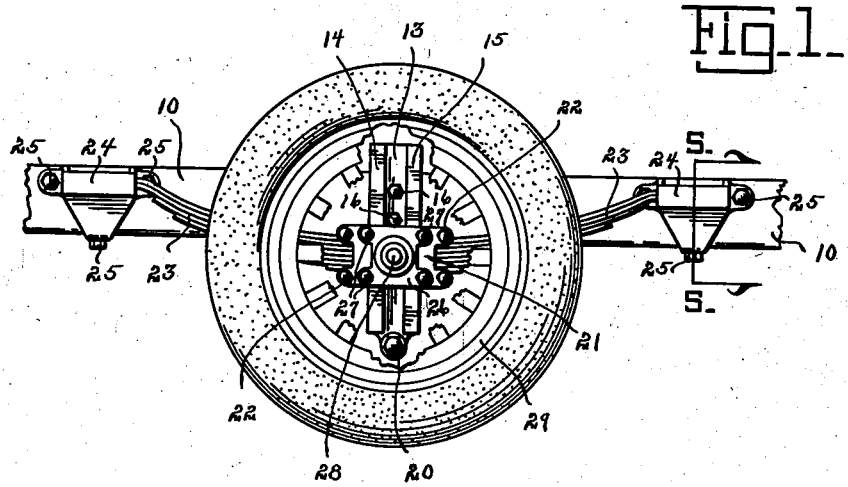
Fig. 1 is a side view of my complete device in use, with sections of the supporting wheel cut away to more fully illustrate its construction and arrangement of parts.
Figure 2:
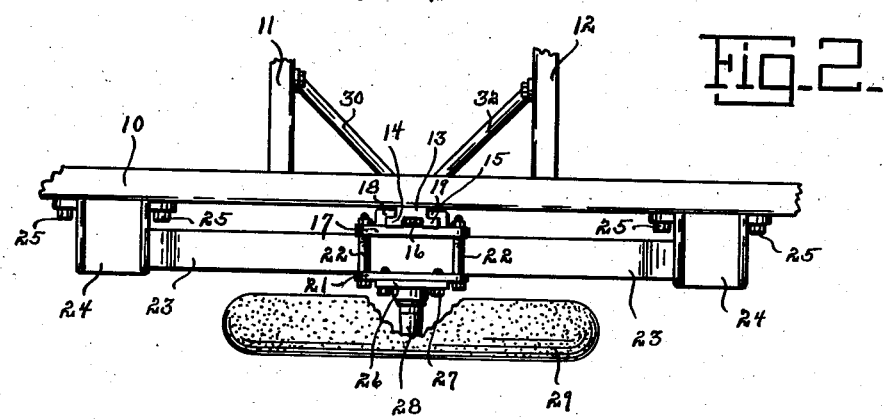
Fig. 2 is a top plan view of my device installed and in use.

It is highly desirable to individually yieldingly secure supporting wheels to many load objects now being used by industry and the public. This individual yieldingly securing of wheels to load objects is commonly known as the "knee-action" method. Perhaps of all the vehicles most needing a simple device for so securing wheels to it, is the house or merchandise trailer and although my device is particularly adapted for trailer use, it may be used to equal advantage in the supporting of various other types of load objects.

Referring to the drawings, I have used the numeral 10 to designate a side beam of a frame of a load object. The numerals 11 and 12 designate spaced apart cross beams secured to the beam 10. It is to such a frame that I attach my device and which I will now explain in detail.

Figure 5:
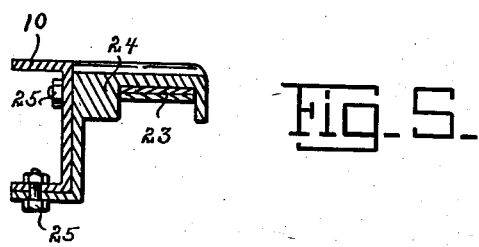
Fig. 5 is an enlarged vertical cross-sectional view of the method of anchoring each of the ends of the leaf spring assembly to the frame of the load object and is taken on line 5—5 of Fig. 1.

The numeral 13 designates a vertical elongated bearing member U-shaped in cross-section and having outwardly and oppositely extending flange ribs 14 and 15, as shown in Fig. 4. The back of this bearing member is designed to engage the beam 10 and be rigidly secured thereto by any suitable means. In the drawings, I show this means in the form of bolts 16. By the bearing member being U-shaped in cross-section, an embracing channel is formed thereby for the heads or nuts of the bolts and eliminates any possibility of the bolts interfering with the sliding function of the device. The numeral 17 designates a plate slidably engaging the outer face of the bearing member and having ear elements 18 and 19 bent around and loosely engaging the bearing member flanges 14 and 15, respectively. By this arrangement of parts the bearing member 13 will be dove-tail grooved in and to the plate 17 and the plate 17 may be easily slid upwardly or downwardly on the elongated vertical bearing member 13. A stop member 20 may be provided on the lower end of the bearing member 13 for limiting the downward sliding movement of the plate member 17. The numeral 21 designates an outer plate member rigidly secured to the plate member 17 by bolts 22. Clamped near its center between the plates 17 and 21 is an ordinary sheaf of leaf springs 23, as shown in Fig. 1. The numeral 24 designates a bracket engaging each of the outer end portions of the leaf spring assembly 23. Each of these bracket members 24 extends over and loosely engages both sides of the spring assembly, as shown in Fig. 5, thereby permitting the longitudinal movement of the spring assembly, but transferring the weight of the load object to and on the outer ends of the spring assembly by being secured to the beam 10 by bolts 25.

The numeral 26 designates a plate detachably secured to the plate 21 by bolts 27. This plate 26 carries a horizontal spindle 28 rotatably mounted upon which is a wheel or like 29. The numeral 30 designates a brace rod having its upper end secured to the cross beam 11 and its lower end adjustably secured to the lower end portion of the member 13 by extending through a flange 31 and having threaded nuts on each side of the flange, as shown in the drawings. The numeral 32 designates a second brace rod having its upper end secured to the cross beam 12 and its lower end adjustably secured to the lower end portion of the member 13 by likewise extending through the flange 31 and having threaded lock nuts on each side of the flange, as shown in Fig. 3.

Assuming that a load object will have two or more wheels so secured to it as shown by my drawings, it will readily be appreciated that the wheels may move upwardly or downwardly relative to the load object independently of each other when the vehicle is being moved over an uneven supporting surface. As the wheel is rigidly secured to the plate 17 which is grooved to the rigid bearing member 13, the upward and downward movement of the wheel will always be in a given straight path, thereby eliminating any tilting or wabbling of the wheel during its function of yieldingly supporting the load object. Such a construction as I have described assures easy riding qualities. To remove the wheel and spindle from the device for replacement or repair it is merely necessary to remove the bolts 27. In some instances, it may be desirable to adjust the bearing member 23 at a slight angle to the vertical in order that the wheel 29 will also operate at a slight angle to the vertical. This adjustment is accomplished by adjusting the nuts on the lower ends of the brace rods 30 and 32, after which the bolts 16 should be tightened.

An important feature of my device is that it eliminates the usual axle extending from one wheel to the other which is even found in present day vehicles having individual spring suspension features. By the elimination of the axle, a vehicle using my device may easily pass over or straddle objects or projections which would not be possible if an axle existed between the wheels. When it is desired to change the wheel of my device or remove it for any reason whatsoever it is merely necessary to remove the spindle nut.

From the foregoing, it will be appreciated that my device is highly desirable for securing a wheel to a load object where it is desired that the wheel be independent in its functioning relative to other wheels that might or might not be also secured to the load object.

Some changes may be made in the construction and arrangement of my improved method of and means for yieldingly supporting an object on a surface engaging element without departing from the real spirit and purpose of my invention, and it is my intention to cover by my claims any modified forms of structure or use of mechanical equivalents which may be reasonably included within their scope.

I claim:

1. In combination with a load object, a member secured to said load object, flanges on said member, a movable member, ear members on said movable member embracing said flanges, a leaf spring secured to said movable member and in engagement with said load object, a detachable plate rigidly secured to said movable member, and a surface engaging wheel rotatably mounted to said plate.

2. In a single wheel suspension mechanism, a horizontal frame, a substantially vertical bearing member secured to said frame and positioned at the outer side of said frame, a movable member slidably mounted on the outer side of said bearing member, a leaf spring secured at its central portion to said movable member and operatively secured at its two ends to said frame; said leaf spring extending longitudinally of said frame, a detachable axle rigidly secured to said movable member and extending outwardly and laterally from said movable member and leaf spring, and a wheel rotatably mounted on said axle.

3. In a single wheel suspension mechanism, a horizontal frame, a substantially vertical bearing member having a longitudinal groove, a plurality of bolts securing said bearing member to said frame having their heads inside said longitudinal groove, a movable member slidably mounted on the outer side of said bearing member, a leaf spring secured at its central portion to said movable member and operatively secured at its two ends to said frame; said leaf spring extending longitudinally of said frame, and a wheel rotatably mounted to said movable member and positioned at the outer side of said movable member and said leaf spring.

ROBERT L. FULTON.